Sept. 4, 1923.   
J. T. LENEGRE   
1,467,179
FURNACE FOR THE TREATMENT OF MINERALS OR ORES
Filed Aug. 29, 1921    3 Sheets-Sheet 1
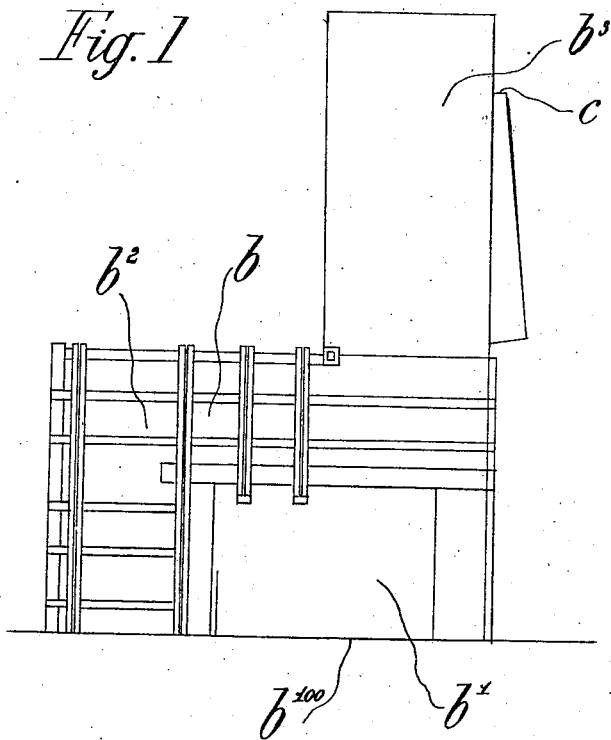
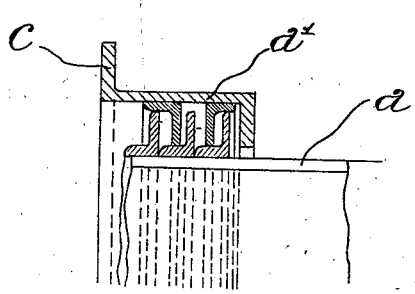
Inventor
José Tartière Lenegre
By
Attorney

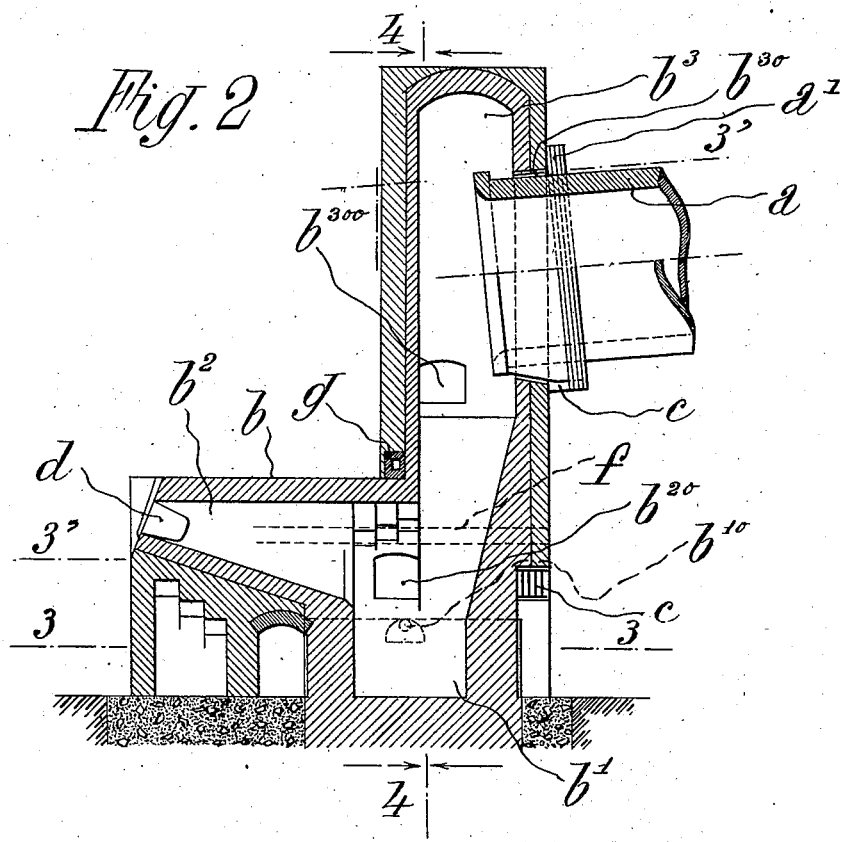
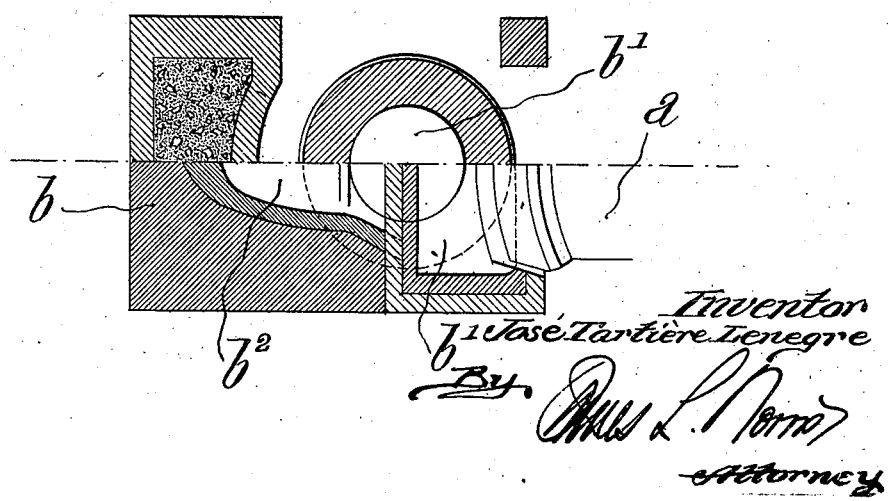

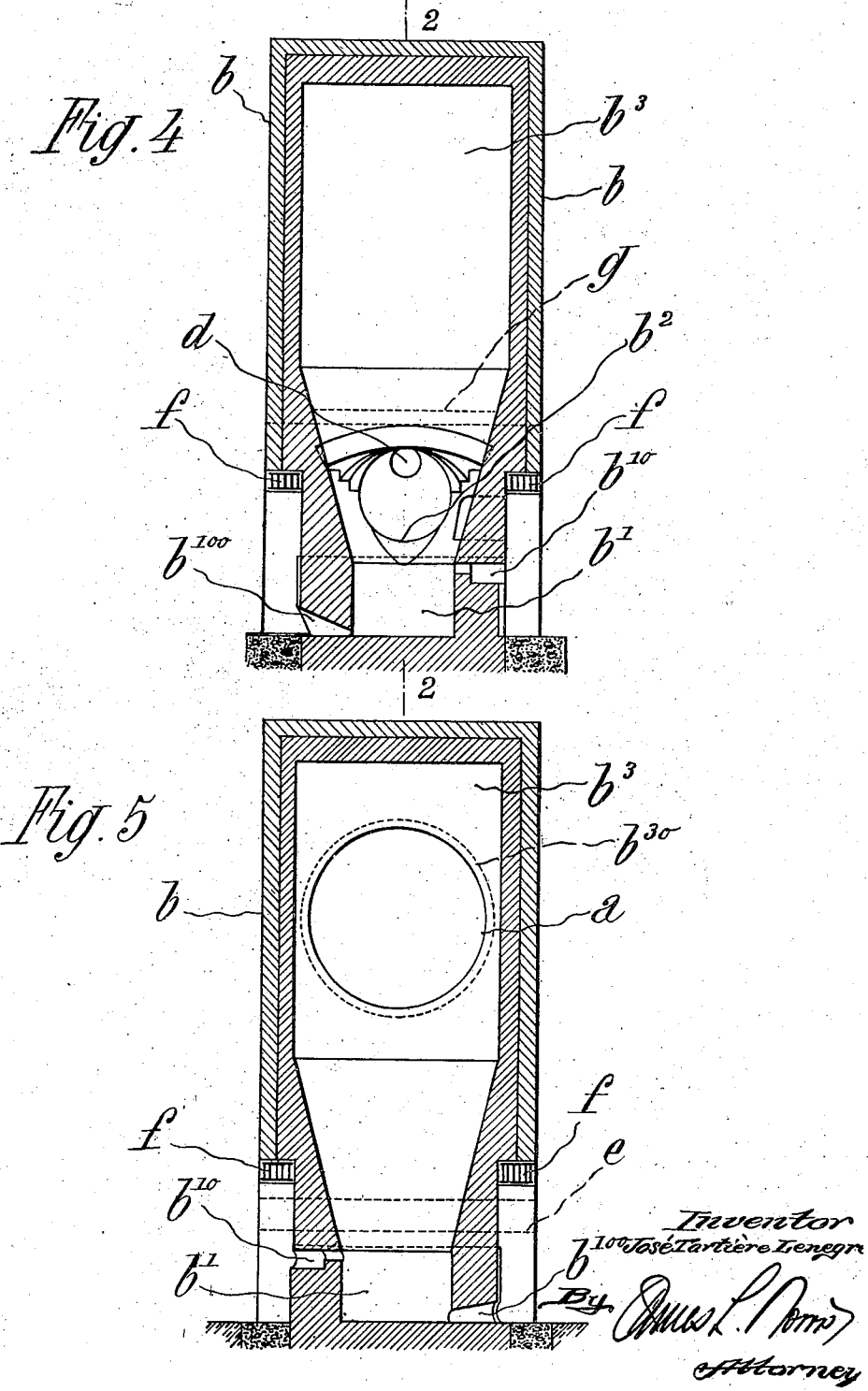

Patented Sept. 4, 1923.

1,467,179

UNITED STATES PATENT OFFICE.

JOSÉ TARTIÈRE LENEGRE, OF OVIEDO, SPAIN.

FURNACE FOR THE TREATMENT OF MINERALS OR ORES.

Application filed August 29, 1921. Serial No. 496,579.

*To all whom it may concern:*

Be it known that I, JOSÉ TARTIÈRE LENE-GRE, a subject of the King of Spain, residing at Oviedo, Province of Oviedo, Spain, have invented certain new and useful Improvements in or Relating to Furnaces for the Treatment of Minerals or Ores, of which the following is a specification.

This invention relates to furnaces for the treatment of ores or minerals for the purpose of extracting the metals therein contained.

The principal object of the invention is so to construct these furnaces that the treatment of the minerals or ores may be facilitated.

According to the general principle of the invention, I provide in constructing a furnace of the class in question, a rotatable cylindrical element into which the minerals to be treated together with the necessary reagents are progressively introduced and a fixed element containing a melting chamber or crucible into which the mixture already treated in the rotatable element falls progressively, and I also provide means for passing first through the fixed element and then through the rotatable element, a hot current of gases adapted to cause, in the presence of the said reagents, the decomposition of the minerals in the rotatable element, the said elements and means being so combined that the metal obtained only becomes actually fused in the fixed element.

The invention includes more particularly a certain method of carrying the same into effect, that is to say, one in which it is applied to the decomposition of a metallic oxide and to certain constructions of furnaces for carrying out the method and to special parts for their construction.

In order that the invention may be more clearly understood, I will now proceed to describe the same with reference to the accompanying drawings, it being clearly understood that such description and drawings are given merely by way of example.

Fig. 1 is an elevation of a part of the furnace.

Fig. 2 is a vertical section on the line 2—2 Fig. 4.

Fig. 3 is a horizontal section as to one portion on the line 3—3, Fig. 2 and as to the other portion on the line 3'—3' Fig. 2.

Fig. 4 is a vertical section on 4—4, Fig. 2 looking in the direction of the arrow shown solid on that figure, whilst Fig. 5 is a section in the same plane looking in the direction of the dotted arrow in Fig. 2.

Fig. 6 is a part vertical section of a constructional detail of the furnace.

The apparatus illustrated is particularly adapted for the decomposition of a metallic oxide, and is constructed substantially as follows:—

$a$ is a cylinder lined on the interior with refractory material $b$ is a body formed from masonry provided at the lower portion with a cavity $b^1$ formed on the interior as a melting chamber or crucible similar to that in an ordinary blast furnace.

This chamber opens to the outside by two apertures, $b^{10}$ and $b^{100}$ and is lined also with refractory material.

$b^2$ is a truncated passage opening to the outside at its end of smaller section and communicating at its end of larger section with the space above the crucible $b^1$.

$b^3$ is a species of chimney, rectangular in section, closed at the top and provided with a circular opening $b^{30}$ in one of its walls. Into this opening one of the extremities of the cylinder $a$ is adapted to be inserted. The lower portion of the chimney extends to the top of the crucible $b^1$ and the truncated passage $b^2$ opens into it. The inner walls—at least the one comprising the opening $b^{30}$— are constructed of refractory brick vertical at the top and sloped slightly towards the bottom with bevelled portions where they join the crucible $b^1$ at the lower end.

The cylinder $a$ is so arranged that it slopes slightly to the horizontal, at an angle which may vary according to the particular case. The lower extremity passes through the opening $b^{30}$ in the chimney and the other extremity may enter a chamber for powder or dust (not shown on the drawing), and a tight joint $a^1$ is preferably provided, as for example the one shown clearly at Fig. 6 adapted to prevent the air passing into the interior and furnished with members $c$ integral respectively with the chimney $b^3$ and the dust chamber, to effect the mounting.

Suitable means are provided for enabling the cylinder $a$ to be rotated with a velocity varying according to requirements. These means may be of any character already used for rotating rotary furnaces.

I provide also at the outside of the apparatus a hearth (not shown), preferably for pulverized coal and of any usual construction. This hearth may be provided with a nozzle $d$, having double metallic walls, and opening into the smaller extremity of the truncated passage $b^2$, the gases from the said hearth being brought to the nozzle under pressure.

In this way I construct a furnace comprising a rotary element—the cylinder $a$—and a fixed element—in the form of a body of masonry $b$, the fixed element being preferably provided with a crucible $b^1$ which is insulated from the body by the lower portion. I prefer to provide stays on the outside, for instance of moulded steel, which are preferably cooled by a water circulation during working. The chimney $b^3$ is also preferably provided with a covering of cast steel plates suitably bound with hoops or the like, and the arrangement is such that the weight is not supported by the walls of the crucible, but is sustained by metallic beams $e$, $f$, and $g$, supported on the exterior of the crucible. The beam $g$ which will be exposed to the greatest heat may be so constructed that it can be cooled on the interior by a water circulation.

The furnace constructed as above may also be provided with an inspection opening $b^{20}$ provided above the crucible in the side wall of the truncated passage $b^2$ and an inspection opening $b^{300}$ provided in the side walls of the chimney $b^3$, between the crucible and the rotary element. It is then adapted to treat metallic oxide for the purpose of extracting the metal.

With this object in view, the combustible issuing from the outlet of the nozzle $d$ is lit. The flames spread out in the truncated channel $b^2$ and fill the space comprising the crucible, then rise in the chimney and penetrating into the rotary element.

The ore to be treated, mixed with the requisite reagents for assisting in its decomposition is introduced into the rotary element by means of suitable apparatus for the purpose of known type, such as a helical conveyor not shown passing through the dust chamber. The rotary element being rotated continuously at a suitable speed according to the nature of the case causes the body of the material to descend, at the same time causing a fresh surface of the material to come constantly into contact with the hot gases. If the arrangement is such that these gases pass into the rotary element at a proper temperature and of proper composition, and if the reagents are properly selected, the decomposition of the ore is caused in the rotary furnace but fusion is not caused.

The material thus treated then drops into the crucible and lies in a heap exposed directly to the high temperature of the gases from the nozzle $d$. The fusible products melt, the metal descends to the bottom of the crucible and is removed through the aperture $b^{100}$ and the lighter materials, such as slag, if there be any, rise and are withdrawn through the aperture $b^{10}$.

In this way I obtain a furnace which fulfills admirably the objects in view.

As will be readily understood and as has already been mentioned, the invention is not limited in any way to the particular method of application or to the constructional embodiments herein described but all modifications may be made coming within a fair interpretation of my claims.

What I claim and desire to secure by Letters Patent of the United States of America is:—

1. In a furnace for the treatment of minerals, the combination of a fixed element containing a crucible, a cylindrical rotary element the axis of which is slightly inclined entering the said fixed element and adapted to feed the mixture of mineral and reagents to the crucible and nozzles for introducing a current of gases for decomposing the minerals whilst only fusing the metal when it enters the fixed element, the distance between the crucible and the rotary element being so great as to permit cooling of the gases sufficiently before reaching the rotary element as to prevent fusion of the ore in said rotary element.

2. In a furnace as claimed in claim 1, a construction in which the mass of material treated in the rotary element and emerging therefrom before fusion takes place, falls into the crucible so as to form a spread out heap which is exposed directly to the high temperature of the gases issuing from nozzles, which cause fusion to take place.

In testimony whereof I have hereunto set my hand in presence of two subscribing witnesses.

JOSÉ TARTIÈRE LENEGRE.

Witnesses:
 VALENTINO G. TRESGUERRES,
 FREDERICK BOWLES.